(12) United States Patent
Kuroki et al.

(10) Patent No.: US 8,574,506 B2
(45) Date of Patent: Nov. 5, 2013

(54) METHOD AND APPARATUS FOR PROCESSING EXHAUST GAS

(75) Inventors: Tomoyuki Kuroki, Sakai (JP); Masaaki Okubo, Sakai (JP); Toshiaki Yamamoto, Sakai (JP); Hidekatsu Fujishima, Kobe (JP); Keiichi Otsuka, Toyonaka (JP)

(73) Assignees: Osaka Prefecture University Public Corporation, Osaka (JP); Japan Science and Technology Ageny, Saitama (JP)

( * ) Notice: Subject to any disclaimer, the term of this patent is extended or adjusted under 35 U.S.C. 154(b) by 457 days.

(21) Appl. No.: 12/528,219

(22) PCT Filed: Feb. 15, 2008

(86) PCT No.: PCT/JP2008/052558
§ 371 (c)(1),
(2), (4) Date: Oct. 16, 2009

(87) PCT Pub. No.: WO2008/102708
PCT Pub. Date: Aug. 28, 2008

(65) Prior Publication Data
US 2010/0044208 A1 Feb. 25, 2010

(30) Foreign Application Priority Data
Feb. 21, 2007 (JP) ................................ 2007-041449

(51) Int. Cl.
*B01J 19/08* (2006.01)
(52) U.S. Cl.
USPC . 422/186.07; 422/169; 422/174; 422/186.04; 204/164; 204/176; 588/311; 588/312; 96/108
(58) Field of Classification Search
USPC ........ 422/186.07, 169, 174, 186.04; 204/164, 204/176; 522/311, 312; 96/108
See application file for complete search history.

(56) References Cited

U.S. PATENT DOCUMENTS 6,193,934 B1 * 2/2001 Yang .............................. 422/174
7,442,218 B2 10/2008 Okubo et al.

FOREIGN PATENT DOCUMENTS

EP 0 199 037 10/1986
JP 11-347355 12/1999
(Continued)

OTHER PUBLICATIONS

Chen et al., "Absorption of $NO_2$ in a Packed Tower with $Na_2SO_3$ Aqueous Solution," Environmental Progress, vol. 21, No. 4, pp. 225-230 (2002).

(Continued)

*Primary Examiner* — Xiuyu Tai
(74) *Attorney, Agent, or Firm* — Stephen J. Weyer; Stites & Harbison, PLLC

(57) ABSTRACT

Disclosed are a method and an apparatus for processing an exhaust gas, which enable to suppress decrease of pH and increase of ORP of a mixture of an aqueous solution of a reducing agent and an aqueous alkali solution circulated within a wet reactor comprising a reduction reaction region and an oxidation reaction region. The method and apparatus enable to prevent deterioration of the mixed aqueous solution, and can be continuously operated for a long time. Specifically, the ORP and pH of the mixed aqueous solution of the aqueous solution of a reducing agent and the aqueous alkali solution to be circulated within the wet reactor are measured, and a fresh aqueous solution of a reducing agent and a fresh aqueous alkali solution are supplied, if necessary, into a reservoir unit arranged in the lower part of the wet reactor so that the ORP and pH of the mixed aqueous solution are kept within predetermined ranges.

5 Claims, 8 Drawing Sheets

(56) References Cited

FOREIGN PATENT DOCUMENTS

| JP | 11 347355 | 12/1999 |
| JP | 2000-051653 | 2/2000 |
| JP | 2000-117049 | 4/2000 |
| JP | 2001-129355 | 5/2001 |
| WO | WO 2005/065805 | 7/2005 |
| WO | WO-2005/065805 | 7/2005 |

OTHER PUBLICATIONS

European Search Report dated Mar. 7, 2012 regarding PCT/JP2008/052558.

* cited by examiner

US 8,574,506 B2

METHOD AND APPARATUS FOR PROCESSING EXHAUST GAS

TECHNICAL FIELD

The present invention relates to a method for processing an exhaust gas, and a processing apparatus used in the method, and in more detail to a processing method capable of efficiently cleaning nitrogen oxide contained in the exhaust gas and suppressing generation of, for example, $N_2O$, $HNO_2$, $HNO_3$, $NO_3-$, CO and the like generating as by products in the processing of an exhaust gas, and to a processing apparatus used for the method.

BACKGROUND ART

In association with supply and consumption of energy represented by an electric power plant, a diesel engine, and a boiler, nitrogen oxides such as nitrogen monoxide (NO) and nitrogen dioxide ($NO_2$) are discharged.

Nitrogen oxides discharged into environment cause photochemical smog and the like, and a countermeasure for this problem is discussed as an important subject of environmental problems in large cities, and also attracts attention as a cause of global warming that is particularly problematic in recent years.

As a method of reducing nitrogen oxides, a combustion system, a catalyst system, a selective catalyst reducing system (SCR), an ammonia spraying system and the like are known, and in recent years, there are known a method of reducing nitrogen oxides by combining the aforementioned catalyst system with techniques such as nonthermal plasma and electron beams, and a method of reducing nitrogen oxides by combining other plasma and electron beam system with a method using chemicals such as ammonia, hydrogen peroxide and calcium chloride, catalysts and the like.

Among such methods, a plasma-chemical hybrid method attracts attention. This method is a method of cleaning exhaust gas containing nitrogen oxide, including: supplying air to a discharge plasma reactor to generate of radical gas; supplying the resultant radical gas to an oxidation reaction area, while supplying the exhaust gas from a line different from the radical gas generation line to the oxidation reaction area, to oxidize nitrogen oxide in the exhaust gas to oxidized gas containing $NO_2$ by the radical gas; and then bringing the oxidized gas into contact with a reducing agent aqueous solution containing a compound such as $Na_2SO_3$, $Na_2S$ and $Na_2S_2O_3$ in a reduction reaction area to reduce $NO_2$ to nitrogen gas, thereby achieving the cleaning (see for example, Patent Documents 1 to 4).

For bringing the plasma-chemical hybrid method into practice, it is necessary to continuously replenish a chemical solution to a chemical scrubber for keeping the ability of removing nitrogen oxide even in a continuous processing condition. For example, a method of supplying an additional reducing agent aqueous solution and an additional alkaline aqueous solution to a circulating processing liquid just before introducing into the reduction reaction area while keeping the pH at 11, and controlling the oxidation-reduction potential (ORP) to −50 to −250 mV is proposed (Non-patent Document 1).

The ORP is an index indicating whether the aqueous solution is in an oxidative atmosphere or a reductive atmosphere, and the lower the value of the ORP (0 mV or less), the stronger the reductive atmosphere is, and the atmosphere shifts from reductive to oxidative as the value increases, and a reductive reaction hardly occurs at an ORP of 100 mV or higher.

In an acidic atmosphere of pH 6 or less, $Na_2SO_3$ serving as a reducing agent reacts with an acid and thus be wasted, and harmful $SO_2$ is generated, so that it is necessary to keep the pH at 6 or higher.

Patent Document 1: International Publication No. 05/065805 pamphlet
Patent Document 2: Japanese Patent Kokai No. 2004-068684
Patent Document 3: Japanese Patent Kokai No. 2000-117049
Patent Document 4: Japanese Patent Kokai No. 2000-051653
Non-patent Document 1: Luke Chen, Jin-Wel Lin and Chen-Lu Yang, "Absorption of $NO_2$ in a Packed Tower with $Na_2SO_3$ Aqueous Solution," Environmental Progress, vol. 21, No. 4, pp. 225-230 (2002)

DISCLOSURE OF INVENTION

Problem to be Solved by the Invention

Although the method disclosed in Non-patent Document 1 is excellent, this is a method which was conducted in a laboratory, and an exhaust gas containing little carbon dioxide ($CO_2$) is used in the experiment. In other words, in this method, existence of $CO_2$ necessarily contained at a concentration of several percentages in a combustion gas is not taken into account.

Inventors of the present invention tested the method described in Non-patent Document 1 that supplies an additional reducing agent aqueous solution and an additional alkaline aqueous solution to a circulated processing liquid just before introducing into a reduction reaction area, wherein a boiler combustor was used.

However, in this test, the pH of the aqueous solution rapidly dropped because of containment of several percentages of $CO_2$ in the exhaust gas, so that it was difficult to keep the condition of pH=11 as described in Non-patent Document 1. Besides, since the ORP also increased, it was difficult to operate at −50 mV or less as described in Non-patent Document 1.

This is attributable to the fact that the additionally supplied reducing agent aqueous solution and alkaline aqueous solution contacted with the exhaust gas containing $CO_2$, and an oxidation reaction of the reducing agent aqueous solution and a reaction of the alkaline aqueous solution with $CO_2$ occurred and resulted in deterioration of these aqueous solutions in a short time, so that the additionally supplied aqueous solutions failed to contribute to recovery of activity of the circulating mixed aqueous solution.

Accordingly, it was difficult to process the exhaust gas continuously for a long time while keeping the ability of removing nitrogen oxide.

Therefore, there is a need for establishing a method of supplying a reducing agent aqueous solution and an alkaline aqueous solution which enable to suppress the decrease of pH and increase of ORP of the mixed aqueous solution circulating in the apparatus.

Means for Solving the Problem

The present invention was made in consideration of these circumstances, and provides a processing method that employs a supplying method of a reducing agent aqueous solution and an alkaline aqueous solution (hereinafter, also called simply as a "processing method") enable to suppress the decease of the pH and increase of the ORP of a mixture of a reducing agent aqueous solution and an alkaline aqueous solution (hereinafter, these aqueous solutions are also taken together and called simply as a "mixed aqueous solution")

circuited during a continuous processing of an exhaust gas, and preventing deterioration of the mixed aqueous solution, and a processing apparatus of an exhaust gas used in the processing method (hereinafter, also called simply as a "processing apparatus").

That is, the processing method of the present invention comprises the steps of:

supplying a radical gas generated by an atmospheric pressure low-temperature nonequilibrium discharge plasma reaction from air, and an exhaust gas containing nitrogen oxide to an oxidation reaction area of a wet reactor having the oxidation reaction area and the reduction reaction area, allowing the nitrogen oxide in the exhaust gas to react with the radical gas to oxidize the nitrogen oxide into $NO_2$, bringing the oxidized gas containing $NO_2$ into contact with a mixed aqueous solution introduced into the reduction reaction area to reduce the $NO_2$ in the oxidized gas to nitrogen gas ($N_2$), and discharging the nitrogen gas into atmospheric air;

for keeping the pH and the ORP of the mixed aqueous solution to be introduced into the reduction reaction area, measuring the pH and the ORP of the mixed aqueous solution, and on the basis of the measurement results supplying the reducing agent aqueous solution and the alkaline aqueous solution to a mixed aqueous solution reservoir unit provided in a lower part of the wet reactor; and circulating the mixed aqueous solution from the reservoir unit to the reduction reaction area.

Effect of the Invention

According to the processing method of the present invention, since a reservoir unit of the mixed aqueous solution is arranged in a lower part of the wet reactor where the oxidation reaction and the reduction reaction are conducted, and the reducing agent aqueous solution and the alkaline aqueous solution are supplied into the reservoir unit, it is possible to prevent the mixed aqueous solution which is additionally supplied from being immediately deteriorated by contact with the exhaust gas containing $CO_2$.

Therefore, the additionally supplied aqueous solution contributes to recovery of activity of the mixed aqueous solution which is used circularly, and decease of pH and increase of ORP of the mixed aqueous solution which is circularly used in the continuous processing are suppressed.

Therefore, it is possible to conduct the process of an exhaust gas continuously for a long time with high efficiency while keeping the ability of removing nitrogen oxide.

EXPLANATION OF REFERENCE NUMERALS

Figure 1:
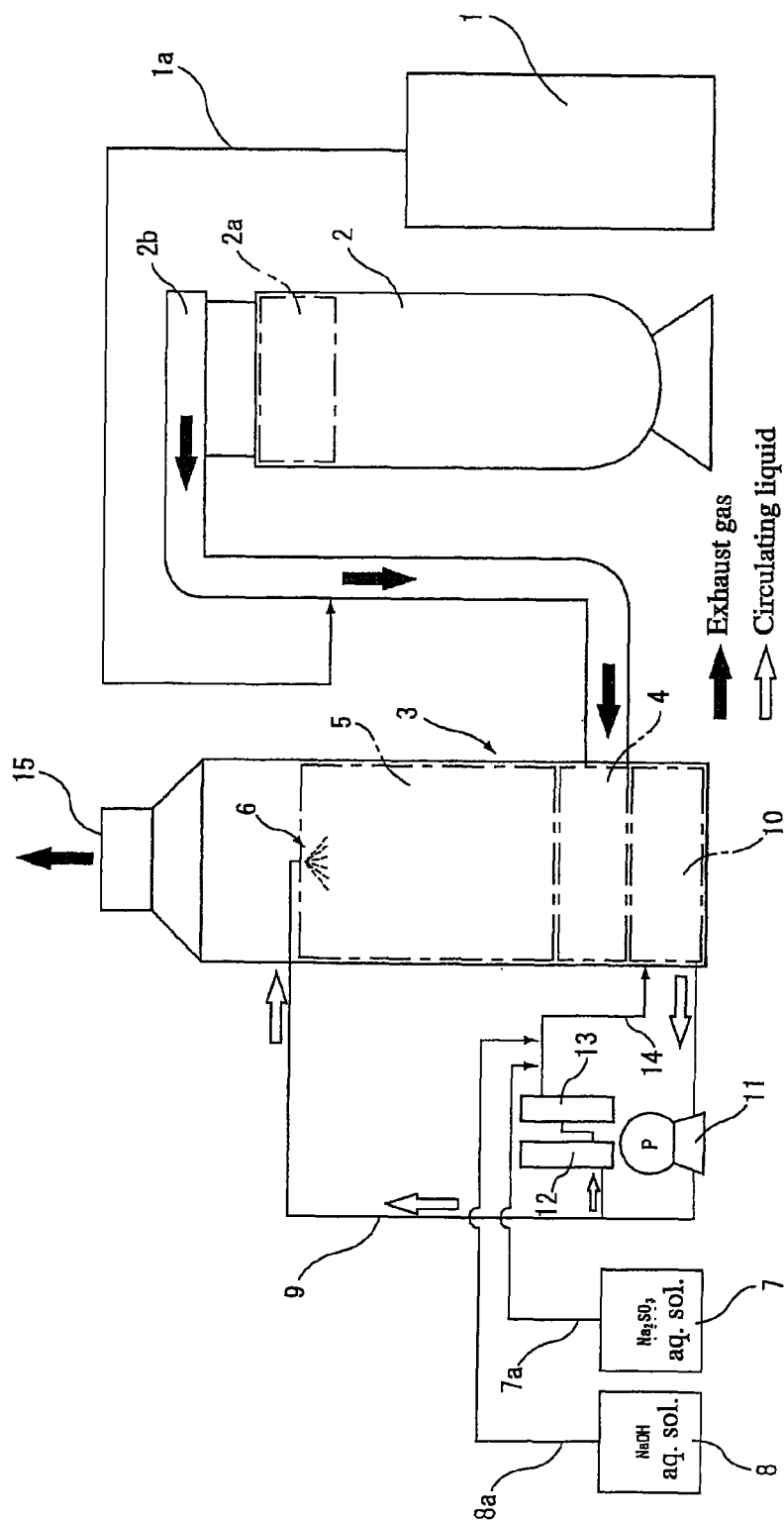
FIG. 1 An explanatory view showing the overall structure of one embodiment of the processing apparatus of the present invention.

1 ozonizer
1a ozone supplying line
2 boiler
2a exhaust heat recovery system
2b exhaust gas introducing line
3 wet reactor
4 oxidation reaction area
5 reduction reaction area
6 spray
7 reducing agent aqueous solution tank
7a reducing agent aqueous solution supplying line
8 alkaline aqueous solution tank
8a alkaline aqueous solution supplying line
9 mixed aqueous solution circulation line
10 mixed aqueous solution reservoir unit
11 circulation pump
12 ORP meter
13 pH meter
14 aqueous solution supplying line
15 gas discharge port

BEST MODE FOR CARRYING OUT THE INVENTION

In the processing method according to the present invention, a radical gas generated from air by a low-temperature nonequilibrium plasma reaction and an exhaust gas containing nitrogen oxide are individually introduced to an oxidation reaction area, or these gases are mixed and introduced to the oxidation reaction area to cause a reaction between the nitrogen oxide in the exhaust gas and ozone in the radical gas to oxidize the nitrogen oxide to $NO_2$, and the mixed aqueous solution is introduced into the reduction reaction area, and brought into contact with the oxidized gas containing $NO_2$, to reduce $NO_2$ in the oxidized gas to nitrogen gas, and then the resultant nitrogen gas is discharged into atmospheric air.

The low-temperature nonequilibrium plasma used in the processing method of the present invention refers to the plasma in an ionized state having a gas temperature considerably lower than the combustion temperature (about 700 to 1000° C.) of a usual gas, and typically refers to plasma of 300° C. or lower, and the lower limit of the temperature is about −200° C.

Preferably, the low-temperature nonequilibrium plasma reaction in the present invention is conducted using an ozonizer of a silent discharge system, and the operation condition is, for example, as follows.

The temperature is 100° C. or lower, preferably ordinary temperature (0 to 40° C.), the pressure is around atmospheric pressure, the relative humidity is 50% or less, the voltage is about 10 kV, and the frequency ranges from 0.42 to 6.82 kHz. Operation of the ozonizer in such a condition provides the advantage that oxidation of NO can be conducted with high energy efficiency.

Also, since the low-temperature nonequilibrium plasma reaction is able to stably generate a radical gas containing ozone from air, it is preferable in implementing the processing method of an exhaust gas not causing a decrease in efficiency even in the case of constant operation.

In the radical gas, O, OH, and $HO_2$ radicals are included besides ozone.

The reducing agent aqueous solution used in the processing method of the present invention contains at least one compound selected from inorganic sulfur-containing reducing agents, and the alkaline aqueous solution contains at least one compound selected from hydroxides of an alkaline metal or an alkaline earth metal.

As the above inorganic sulfur-containing reducing agents, sodium sulfite ($Na_2SO_3$), sodium sulfide ($Na_2S$), sodium thiosulfate ($Na_2S_2O_3$) and the like are recited.

As the hydroxides of an alkaline metal or an alkaline earth metal, sodium hydroxide (NaOH), calcium hydroxide ($Ca(OH)_2$), potassium hydroxide (KOH) and the like are recited.

In the processing method of the present invention, the pH and the ORP of the mixed aqueous solution are measured as needed, and the reducing agent aqueous solution and the alkaline aqueous solution are appropriately supplied into a mixed aqueous solution reservoir unit from a reducing agent aqueous solution tank and an alkaline aqueous solution tank on the basis of the measurement results.

The pH of the mixed aqueous solution introduced into the reduction reaction area is preferably 6 to 10, and more preferably 8 to 9. The ORP of the mixed aqueous solution is preferably −50 to 100 mV, and more preferably −50 to 0 mV.

For checking the gas before discharge, for example, NOx concentration measurement by an NOx meter, ozone concentration measurement by an ozone monitor and the like are conducted as needed on the gas before discharge, and the operation condition of the processing method is modified as needed on the basis of the results of such measurements.

For example, when ozone is detected at a concentration of 1 ppm or higher in the gas to be discharged, ozone discharge is controlled by adjusting an ozone generation amount in the plasma reaction part.

The processing method of the present invention is suitable for processing an exhaust gas discharged from a flue and smoke tube boiler or an exhaust gas discharged from a diesel engine.

The present invention also provides a processing apparatus of an exhaust gas used in the aforementioned processing method.

The processing apparatus of the present invention comprises a wet reactor having an oxidation reaction area and a reduction reaction area, a reservoir unit arranged in a lower part of the wet reactor, an atmospheric-pressure low-temperature nonequilibrium discharge plasma reaction part for generating a radical gas from air, a radical gas introducing line for introducing the generated radical gas to the oxidation reaction area, an exhaust gas introducing line for introducing an exhaust gas containing nitrogen oxide to the oxidation reaction area, a mixed aqueous solution circulation line for circulating a mixed aqueous solution and introducing the mixed aqueous solution into the reduction reaction area, a pH meter and an ORP meter provided in the route which is branched from the circulation line and leads to the reservoir unit, and a reducing agent aqueous solution supplying line coming from a reducing agent aqueous solution tank and an alkaline aqueous solution supplying line coming from an alkaline aqueous solution tank, which are connected with the route on the downstream sides of the pH meter and the ORP meter.

According to the processing apparatus, it is possible to keep the activity of the mixed aqueous solution used circularly within an appropriate range, by supplying a fresh reducing agent aqueous solution and a fresh alkaline aqueous solution to the reservoir unit to keep the pH and ORP of the circulating mixed aqueous solution within predetermined ranges.

Accordingly, it is possible to conduct the processing method of an exhaust gas containing nitrogen oxide in a stable manner for a long time, which includes allowing nitrogen oxide in the exhaust gas to react with the radical gas containing ozone in the oxidation reaction area to oxidize the nitrogen oxide to $NO_2$, bringing $NO_2$ in the oxidized gas into contact with the mixed aqueous solution in the reduction reaction area to reduce $NO_2$ to nitrogen gas, and discharging the resultant nitrogen gas into atmospheric air.

As the wet reactor in the processing apparatus of the present invention, a tower reactor or a column reactor realizing excellent reaction efficiency is preferred.

The reduction reaction area is charged with Tellerette S-(II) (trade name, available from Tsukishima Kankyo Engineering, Ltd.) made of polypropylene, Raschig Super-Ring RSR (trade name, available from RASCHIG GmbH) made of SUS, or the like, for promoting contact between the gas and the liquid participating in the reaction.

A mixed aqueous solution circulating part in the processing apparatus of an exhaust gas according to the present invention consists of a circulation line for circulating the mixed aqueous solution inside the reservoir unit to the reduction reaction area, and a circulation pump.

An aqueous solution supplying part consists of a reducing agent aqueous solution tank, an alkaline aqueous solution tank, an aqueous solution supplying line which is branched from the circulation line and leads to the reservoir unit, an ORP meter and a pH meter provided along the aqueous solution replenishing line, and a reducing agent aqueous solution supplying line from the reducing agent aqueous solution tank and an alkaline aqueous solution supplying line from the alkaline aqueous solution tank, which are respectively connected on the downstream side of the ORP meter and the pH meter.

Therefore, it is possible to prevent the additionally supplied mixed aqueous solution from coming into contact with the exhaust gas containing $CO_2$ and deteriorating in a short time, and thus to suppress the decease of pH and the increase of ORP of the mixed aqueous solution circulating during a continuous processing. This contributes to recovery of activity of the mixed aqueous solution used circularly.

Therefore, it is possible to conduct the process of an exhaust gas continuously for a long time with high efficiency while keeping the ability of removing nitrogen oxide.

In the following, the processing apparatus of the present invention is explained in detail based on the drawings. In the following explanation, the same member in embodiments of the present invention is denoted by the same reference numeral.

Figure 2:
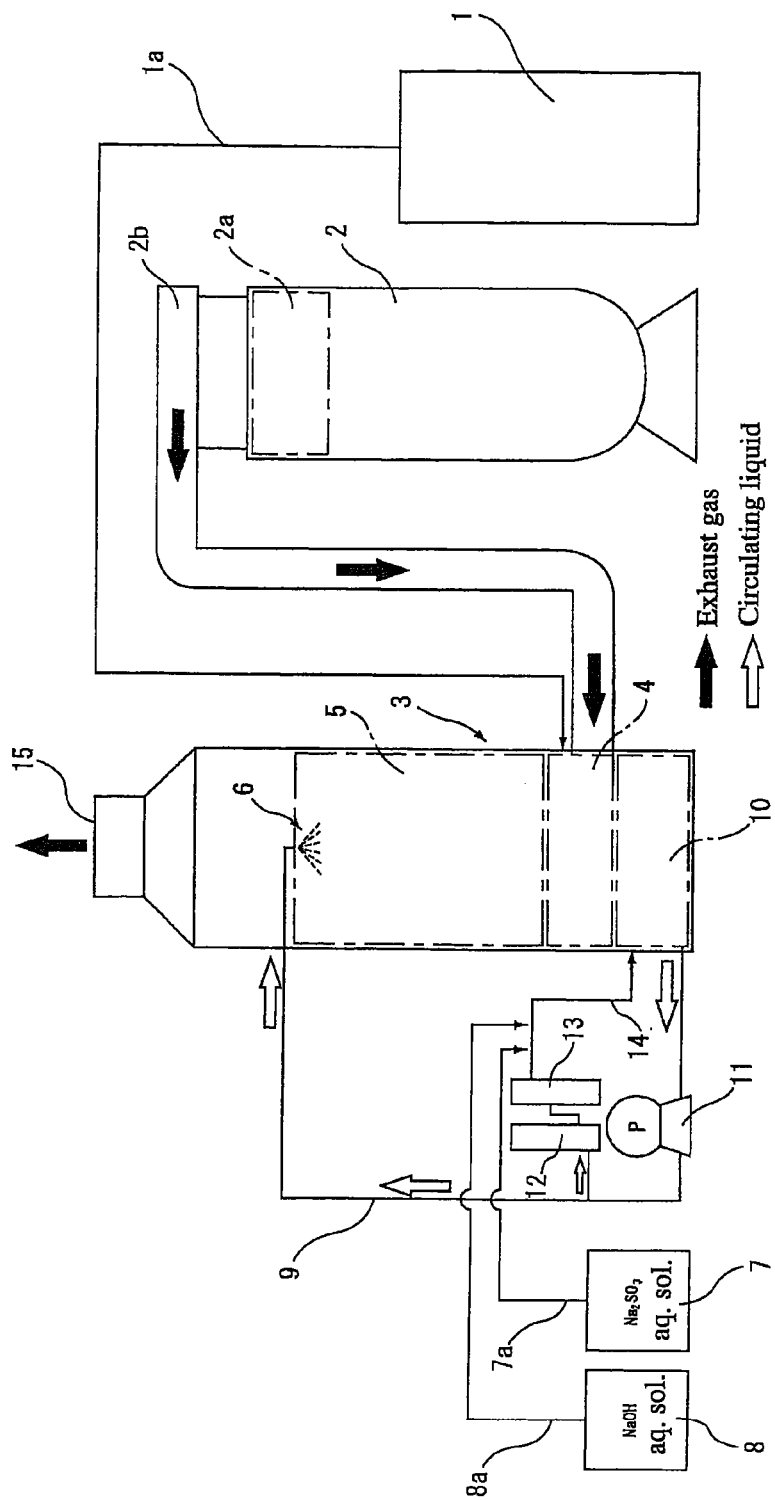
FIG. 2 An explanatory view showing the overall structure of another embodiment of the processing apparatus of the present invention.
Figure 3:
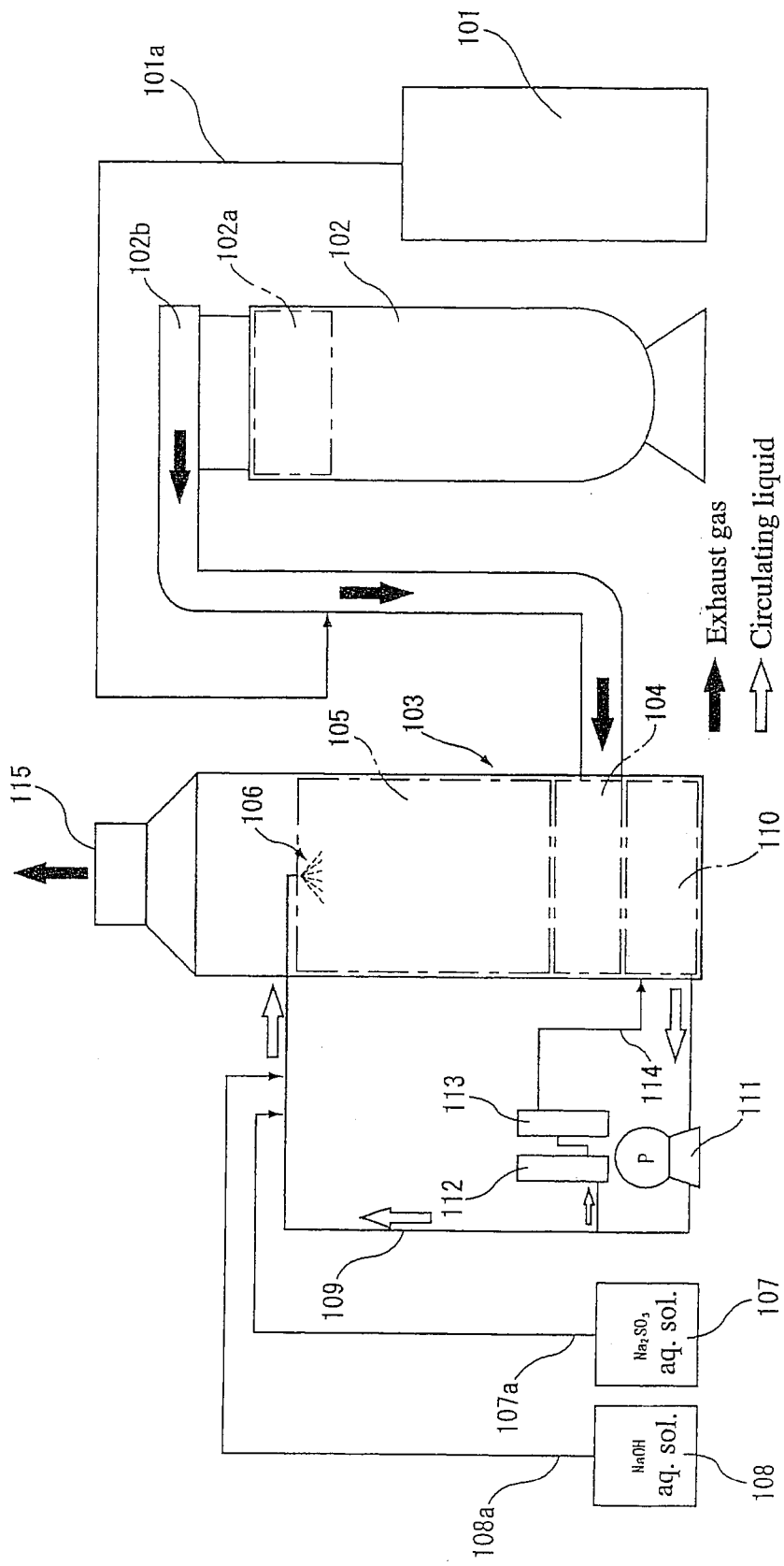
FIG. 3 An explanatory view showing the overall structure of a conventional processing apparatus.

FIG. 1 is an explanatory view showing the overall structure of one embodiment of the processing apparatus of the present invention; FIG. 2 is an explanatory view showing the overall structure of another embodiment of the processing apparatus of the present invention; and FIG. 3 is an explanatory view showing the overall structure of a comparative conventional processing apparatus.

First, the processing apparatus according to one embodiment of the present invention shown in FIG. 1 is explained.

The processing apparatus of the present invention mainly includes an ozonizer 1 serving as a low-temperature nonequilibrium discharge plasma reaction part, a boiler 2, a wet reactor 3 having an oxidation reaction area 4 and a reduction reaction area 5, a reducing agent aqueous solution tank 7, an alkaline aqueous solution tank 8, a mixed aqueous solution reservoir unit 10 provided in a lower part of the wet reactor 3, an exhaust gas introducing line 2b connecting the boiler 2 and the oxidation reaction area 4, an ozone introducing line 1a connecting the ozonizer 1 and the oxidation reaction area 4 through the exhaust gas introducing line 2b, a mixed aqueous solution circulation line 9 connecting the reservoir unit 10 and an upper part of the reduction reaction area 5 while a circulation pump 11 is disposed therebetween, and an aqueous solution supplying line 14 which is branched from the circulation line 9, passes through an ORP meter 12 and a pH meter 13, and joins on their downstream side to a reducing agent aqueous solution supplying line 7a from the reducing agent aqueous solution tank 7 and an alkaline aqueous solution supplying line 8a from the alkaline aqueous solution tank 8, and leads to the reservoir unit 10.

More specifically, the ozonizer 1 processes air by low-temperature nonequilibrium plasma to generate ozone which is a kind of radical gas, and the generated ozone gas is directed from the upper part of the ozonizer 1 to the midway of the exhaust gas introducing line 2b from the boiler 2 through the ozone introducing line 1a, and then directed to the oxidation reaction area 4 together with the exhaust gas from the boiler 2.

An exhaust heat recovery system 2a is provided in an upper part of the boiler 2, and the exhaust gas containing nitrogen oxide after heat recovery at the exhaust heat recovery system 2a passes through the exhaust gas introducing line 2b and is directed to the oxidation reaction area 4 while it joins the ozone gas in the midway.

The wet reactor 3 is a tower reactor consisting of the oxidation reaction area 4 in the lower part, and the reduction reaction area 5 in the upper part, and the oxidation reaction area 4 and the reduction reaction area 5 are present in one wet reactor 3 (scrubber). At the top end of the wet reactor 3, a discharge port 15 for the processed gas is provided, and under the oxidation reaction area 4, the reservoir unit 10 is provided.

In an upper part of the reduction reaction area 5, a spray 6 is disposed, and a mixed aqueous solution of the reducing agent (e.g., $Na_2SO_3$) aqueous solution and the alkaline (e.g., NaOH) aqueous solution circulated from the reservoir unit 10 through the circulation line 9 is sprayed inside the reduction reaction area 5 from the spray 6.

The reduction reaction area 5 is charged with a filler (not illustrated) for promoting a reduction reaction by increasing the chance of contact between the gas and the liquid.

A boundary between the reduction reaction area 5 and the oxidation reaction area 4 is provided with a partition having a plurality of through holes for allowing the oxidized gas containing $NO_2$ gas generated in the oxidation reaction area 4 to pass to the reduction reaction area 5, and allowing the mixed aqueous solution to pass from the reduction reaction area 5 to the oxidation reaction area 4.

Also, a boundary between the oxidation reaction area 4 and the reservoir unit 10 may be provided with a partition having a plurality of through holes for allowing the mixed aqueous solution coming from the reduction reaction area 5 through the oxidation reaction area 4.

In an upper part of the reservoir unit 10, the aqueous solution supplying line 14 is connected, and an overflow port (not illustrated) is provided for the case that the reservoir unit 10 is filled with the mixed aqueous solution. In a lower part of the reservoir unit 10, the circulation line 9 of the mixed aqueous solution is connected.

Nitrogen oxide in the exhaust gas introduced into the oxidative reaction area 4 is oxidized to $NO_2$ by the ozone introduced into the oxidation reaction area 4.

The oxidized gas containing $NO_2$ thus generated in the oxidation reaction area enters the reduction reaction area 5, and is then reduced to nitrogen gas as a result of contact with the mixed aqueous solution sprayed from the spray 6, and the resultant nitrogen gas is discharged into the atmospheric air through the gas discharge port 15.

The mixed aqueous solution which contacted with the oxidized gas containing $NO_2$ in the reduction reaction area 5 enters the oxidation reaction area 4 from the reduction reaction area 5, and then enters the reservoir unit 10 from the oxidation reaction area 4 to be ready for the next circulation.

The mixed aqueous solution circulating part consists of the circulation line 9 and the circulation pump 11 provided along the circulation line 9, and a starting end of the circulation line 9 is connected to a lower part of the reservoir unit 10, and a terminal end thereof is connected to the spray 6.

The mixed aqueous solution reserved in the reservoir unit 10 is designed to flow from the reservoir unit 10 to the circulation line 9, the reduction reaction area 5 and the oxidation reaction area 4 and then return to the reservoir unit 10 by driving of the circulation pump 11.

A part of the circulating mixed aqueous solution enters a route branched from the circulation line 9, and undergoes measurements of the ORP and the pH by the ORP meter 12 and the pH meter 13, respectively, and then returns again to the reservoir unit 10 through the aqueous solution supplying line 14. While the ORP meter 12 is provided on the upstream side, and the pH meter is provided on the downstream side in this embodiment, the order of these meters is arbitrary.

A reducing agent aqueous solution supplying line 7a and an alkaline aqueous solution supplying line 8a are respectively connected to the aqueous solution supplying line 14 on the downstream side of the ORP meter 12 and the pH meter 13.

A leading end of the reducing agent aqueous solution supplying line 7a is connected to the reducing agent ($Na_2SO_3$) aqueous solution tank 7, and a leading end of the alkaline aqueous solution supplying line 8a is connected to the alkaline (NaOH) aqueous solution tank 8.

When the measured ORP value of the mixed aqueous solution is higher than a predetermined value, the reservoir unit 10 is supplied with the reducing agent aqueous solution by turning on a liquid feeding pump (not illustrated) provided along the reducing aqueous solution supplying line 7a.

Likewise, when the measured pH of the mixed aqueous solution is lower than a predetermined value, the reservoir unit is supplied with the alkaline aqueous solution by turning on a liquid feeding pump (not illustrated) provided along the alkaline aqueous solution supplying line 8a.

In this manner, by measuring the ORP and the pH of the mixed aqueous solution at any time, and supplying the reducing agent aqueous solution and the alkaline aqueous solution appropriately on the basis of the measurement results, the ORP and the pH of the mixed aqueous solution reserved in the reservoir unit 10 are kept within predetermined ranges.

Accordingly, although the mixed aqueous solution having circulated the wet reactor 3 and thus having decreased activity is returned to the reservoir unit 10, the activity of the mixed aqueous solution inside the reservoir unit 10 is kept within a predetermined range.

In the present embodiment, since the reducing agent aqueous solution and the alkaline aqueous solution to be supplied are temporally reserved in the reservoir unit 10, and do not contact with the ozone gas and the exhaust gas, it is possible to avoid rapid oxidation of the reducing agent by the ozone gas, and rapid deterioration of the alkaline aqueous solution by $CO_2$ contained in the exhaust gas.

Another embodiment shown in FIG. 2 is different from the processing apparatus of FIG. 1 in that the ozone gas introducing line 1a and the exhaust gas introducing line 2b are individually and directly guided to the oxidation reaction area 4, rather than the ozone gas introducing line 1a is connected to the exhaust gas introducing line 2b as shown in FIG. 1.

This processing apparatus is more preferred than the processing apparatus shown in FIG. 1 in that a decrease in activity of ozone due to heat of the exhaust gas can be prevented because the ozone gas introducing line 1a is directly guided to the oxidation reaction area 4.

Other points than those described above are identical to those of the processing apparatus of FIG. 1, and hence detailed explanation thereof are omitted.

FIG. 3 is an explanatory view showing the overall structure of a processing apparatus described in Non-patent Document 1 and used for comparison in test examples described below.

This conventional example differs from the above-described processing apparatus of the present invention in that the reducing agent aqueous solution and the alkaline aqueous solution to be additionally supplied for recovery of activity of the mixed aqueous solution are directly supplied to the circulation line 9.

In this conventional example, since the reducing agent aqueous solution and the alkaline aqueous solution having additionally supplied are immediately sprayed from the spray 6 and contact with the exhaust gas, oxidation of the reducing agent and deterioration of the alkali aqueous solution by $CO_2$ occur. Accordingly, the additionally supplied reducing agent aqueous solution and alkaline aqueous solution will not contribute to recovery of activity of the mixed aqueous solution used circularly, and the mixed aqueous solution is gradually degraded.

Therefore, in the conventional method of the example, it is difficult to maintain the pH and the ORP of the aqueous solution used circularly within predetermined ranges capable of keeping the ability for removing nitrogen oxide, and this difficulty posed a great impediment in continuously processing the exhaust gas for a long time.

To the contrary, in the processing apparatus according to the present invention, since the reducing agent aqueous solution and the alkaline aqueous solution are supplied to the reservoir unit 10 as described above, the supplied aqueous solution is not sprayed from the spray 6 immediately and brought into contact with the exhaust gas immediately. Therefore, the supplied aqueous solution contributes to recovery of activity of the mixed aqueous solution used circularly.

Therefore, according to the processing apparatus of the present invention, it is possible to circulate the reducing agent aqueous solution and the alkaline aqueous solution while keeping their pH and ORP values within the predetermined ranges required for keeping the ability for removing nitrogen oxide. This enables continuous process of the exhaust gas containing nitrogen oxide.

Test Example 1

A test of process of an exhaust gas from a pilot plant boiler was conducted by using the processing apparatus of the present invention shown in FIG. 1, and the comparative conventional processing apparatus shown in FIG. 3, respectively.

The exhaust gas containing nitrogen oxide discharged from the boiler 2 was introduced into the oxidation reaction area 4 of the wet reactor 3 through the exhaust gas introducing line 2b after passing through the exhaust heat recovery system 2a.

On the other hand, a radical gas containing ozone generated in the ozonizer 1 was introduced from the ozone introducing line 1a to the exhaust gas introducing line 2b, and introduced to the oxidation reaction area 4 together with the exhaust gas.

The initial concentration of sodium sulfite in the reservoir unit 10 was 15.75 g/L.

The mixed aqueous solution introduced into the reduction reaction area 5 of the wet reactor 3 was sprayed from the spray 6 in an upper part of the reduction reaction area 5, and returned to the reservoir unit 10 in the lower part through the reduction reaction area 5 and the oxidation reaction area 4, and then fed again to the spray 6 in the upper part through the circulation line 9 by the circulation pump 11.

The pH value and the ORP value of the aqueous solution circulating in the processing apparatus were measured on the downstream side of the circulation pump 11 on the route which is branched from the circulation line 9 and leads to the reservoir unit 10.

The circulating mixed aqueous solution was a mixture of a reducing agent aqueous solution containing sodium sulfite ($Na_2SO_3$) for reducing $NO_2$ to $N_2$, and an alkaline aqueous solution containing sodium hydroxide (NaOH) for pH adjustment, and in order to control the pH and the ORP of the mixed aqueous solution, the reducing agent aqueous solution (concentration: 63 g/L) was supplied at a rate of 1 L/min., and the alkaline aqueous solution (concentration: 10%) was supplied at a rate of 30 mL/min. (repetition of 5-min. supplying and 1-min. suspension), respectively from the reducing agent aqueous solution tank 7 and the alkaline aqueous solution tank 8.

While the liquid level of the reservoir unit 10 rose as a result of supply of the aqueous solution, the liquid level was kept constant by drainage through the overflow port (not illustrated) provided in an upper part of the reservoir unit 10.

In this test, an exhaust gas generated in a large volume in a flue and smoke tube system boiler, namely an exhaust gas containing also $CO_2$ was used as a gas to be processed. The flow rate of the exhaust gas was set at 500 $Nm^3$/hour, and the flow rate of the mixed aqueous solution was set at 4500 L/hour.

Figure 4:
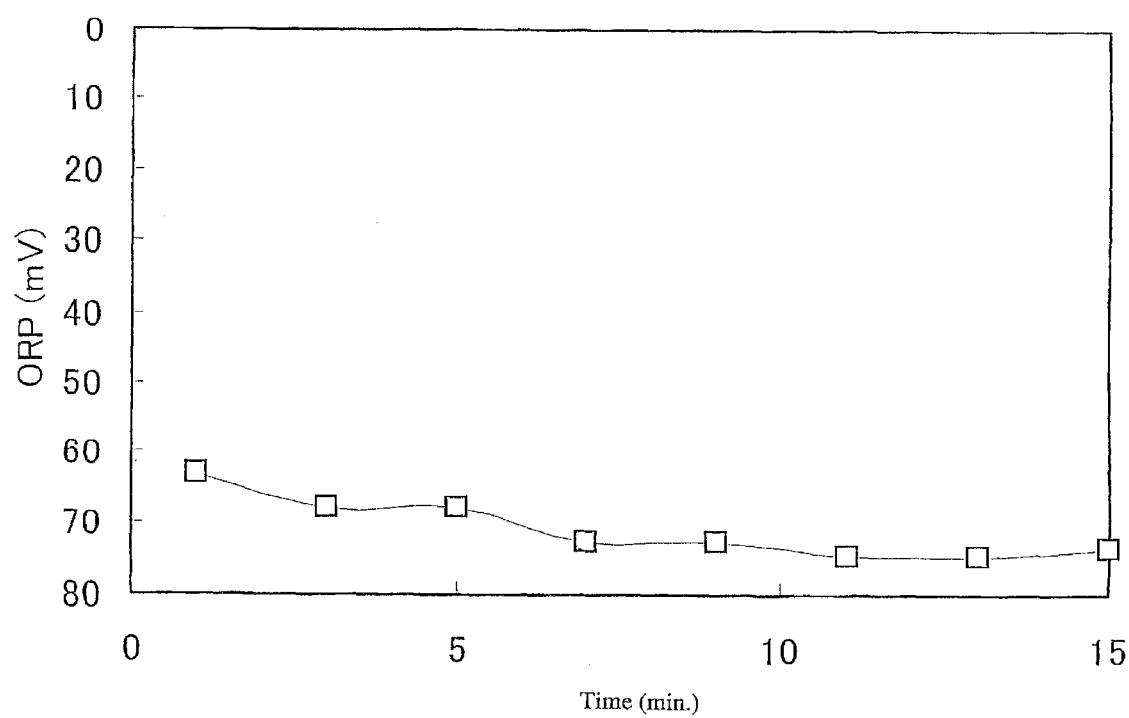
FIG. 4 A graph showing a change in the ORP of a mixed aqueous solution when the processing apparatus of the present invention is used in Test Example 1.
Figure 5:
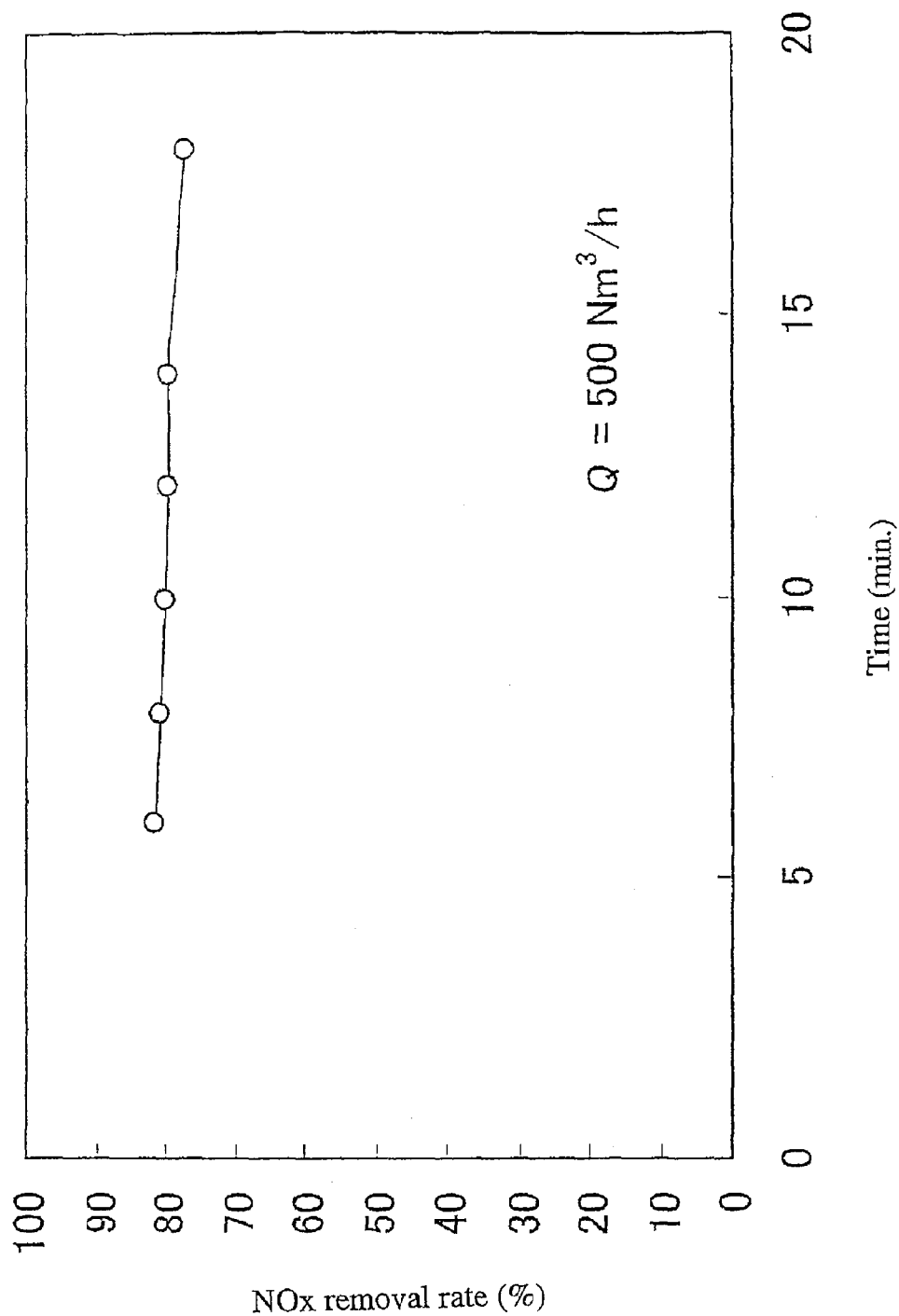
FIG. 5 A graph showing a change in the removal rate of nitrogen oxide when the processing apparatus of the present invention is used in Test Example 1.

The results of the test are shown in FIG. 4 and FIG. 5.

FIG. 4 is a graph showing a change in the ORP value of the mixed aqueous solution together with respect to the time after starting of the test in case where the flow rate of the exhaust gas is 500 $Nm^3$/hour, and it is demonstrated that an increase of the ORP value was suppressed with the processing apparatus of the present invention.

FIG. 5 is a graph showing a change in the removal rate of nitrogen oxide with respect to the time after starting of the test, and shows the tendency that the removal rate changes at a high level without sudden lowering of the removal rate with the processing apparatus of the present invention.

From these results, it was found that in the processing apparatus of the present invention, by supplying the reducing agent aqueous solution and the alkaline aqueous solution to the reservoir unit 10, it is possible to suppress the increase of the ORP value of the circulating mixed aqueous solution, and to prevent lowering of the removal rate of the nitrogen oxide.

Test Example 2

Test Example 1 was repeated by using the processing apparatus of the present invention shown in FIG. 1, and a comparative conventional processing apparatus as shown in FIG. 3, except that the process conditions were changed as follows.

That is, the reducing agent aqueous solution (concentration: 126 g/L) was supplied at a rate of 0.6 to 0.7 L/min., and the alkaline aqueous solution (concentration: 10%) was supplied at a rate of 15 mL/min.

Also, the flow rate of the exhaust gas was set at 940 to 960 $Nm^3$/hour, the flow rate of the mixed aqueous solution was set at 3000 to 4500 L/hour, and the ozone introducing amount was set at 73 g/hour.

Figure 6:
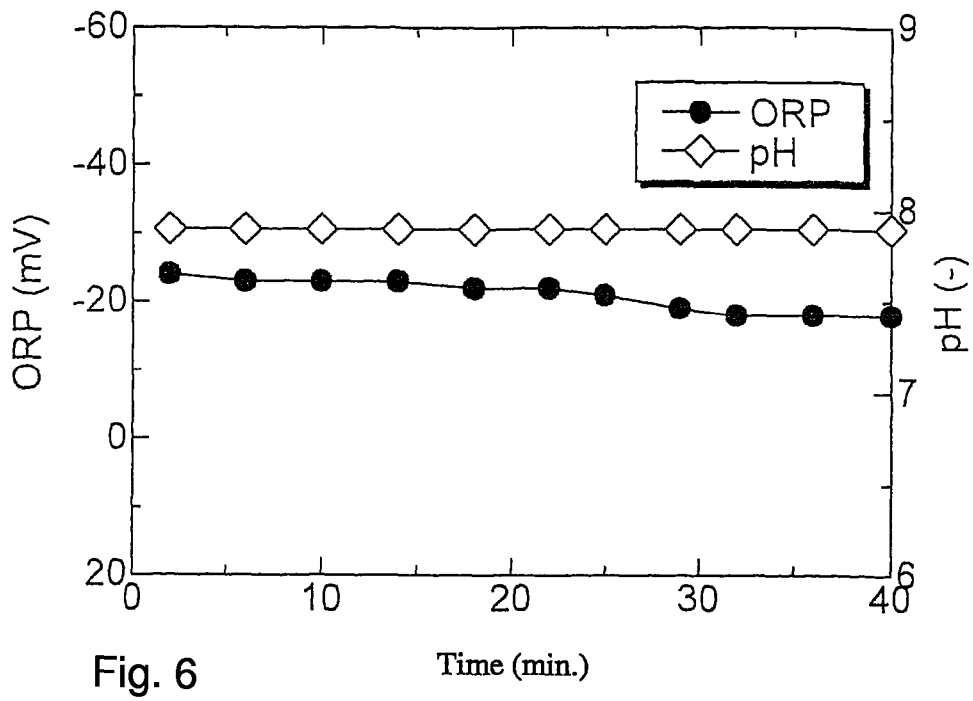
FIG. 6 A graph showing changes in ORP and pH of the mixed aqueous solution when the processing apparatus of the present invention is used in Test Example 2, wherein ● represents a change in ORP, and ◇ represents a change in pH.
Figure 7:
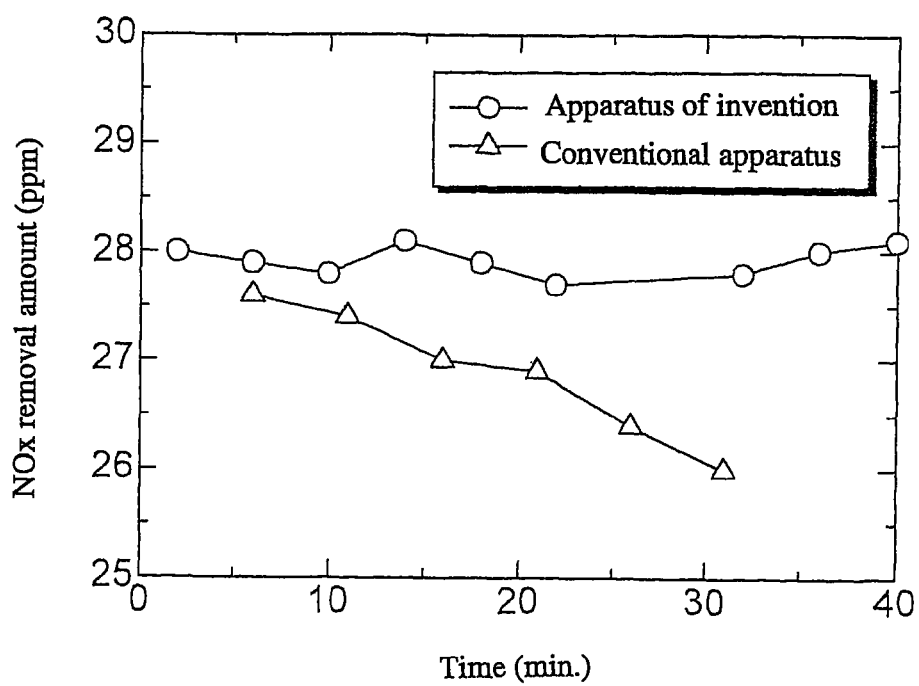
FIG. 7 A graph showing a change in the removal amount of nitrogen oxide in Test Example 2, wherein ○ represents a removal amount by the processing apparatus of the present invention and Δ represents a removal amount by a comparative conventional processing apparatus.

The test results are shown in FIG. 6 and FIG. 7.

FIG. 6 is a graph showing changes in the ORP value and the pH value of the mixed aqueous solution with respect to the time after starting of the test, and demonstrates that increase of the ORP value and decease of the pH value were suppressed with the processing apparatus of the present invention.

FIG. 7 is a graph showing change in the removal amount of the nitrogen oxide with respect to the time after starting of the test. In this graph, ○ represents the removal amount by the processing apparatus of the present invention, and Δ represents the removal amount by the comparative conventional processing apparatus.

While the removal amount decreased with the lapse time in case of the conventional processing apparatus, rapid lowering of the removal amount was not observed, and high level of the removal amount was maintained with the processing apparatus of the present invention.

From these results, it was found that in the processing apparatus of the present invention, by supplying the reducing agent aqueous solution and the alkaline aqueous solution into the reservoir unit 10, increase of the ORP value and decease of the pH value of the circulating mixed aqueous solution could be suppressed, and lowering of the removal amount of nitrogen oxide could be prevented.

Test Example 3

Test Example 1 was repeated by using the processing apparatus of the present invention except that the process conditions were changed as follows.

That is, the flow rate of the exhaust gas was set at 1100 $Nm^3$ or 1590 $Nm^3$, and the flow rate of the mixed aqueous solution was set at 5800 L/hour.

Figure 8:
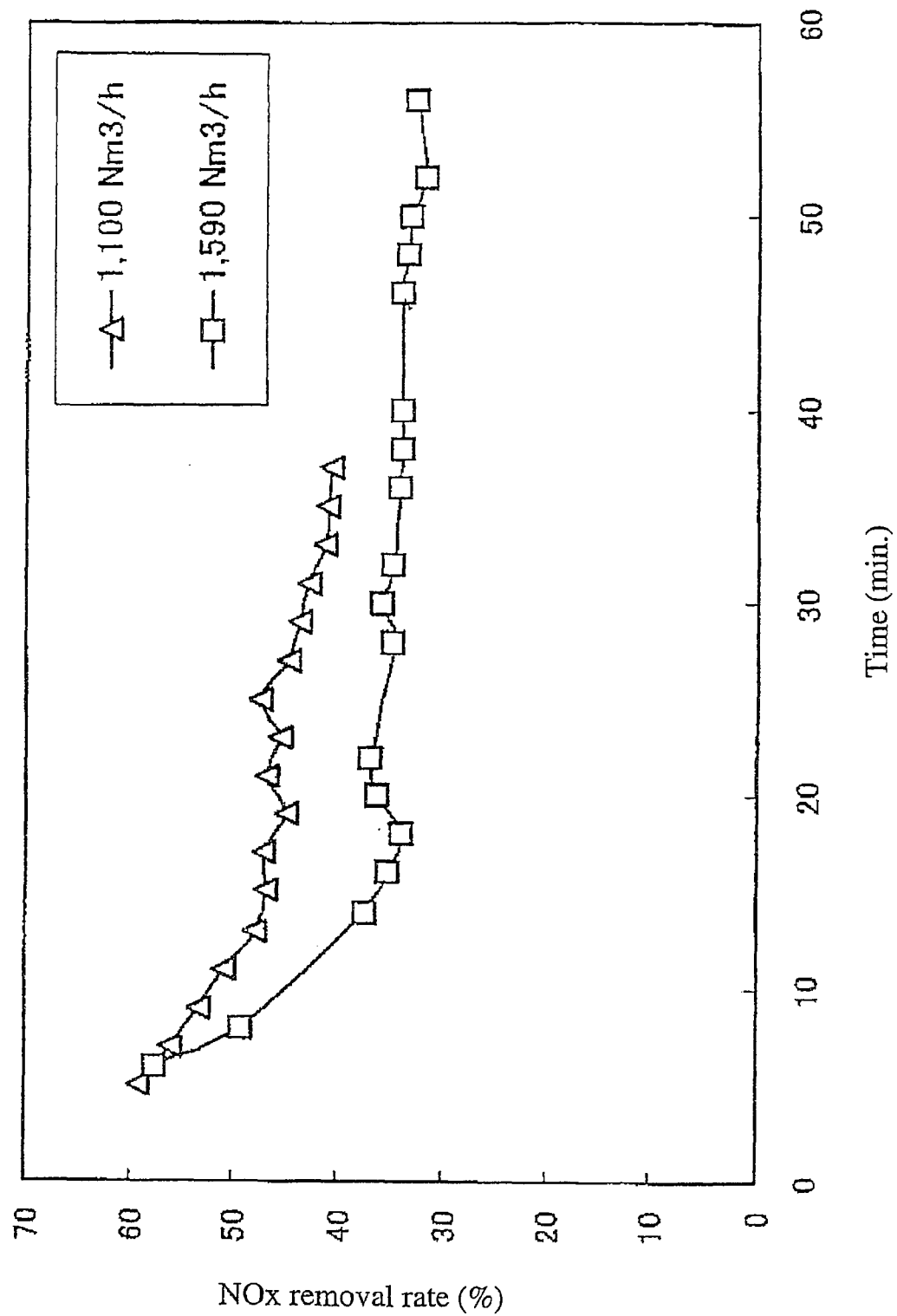
FIG. 8 A graph showing changes in the removal rate of nitrogen oxide in Test Example 3, wherein Δ represents the removal rate in case where the flow rate of the exhaust gas is 1100 $Nm^3$/hour, and □ represents the removal rate in case where the flow rate of the exhaust gas is 1590 $Nm^3$/hour.

The results are shown in FIG. 8.

FIG. 8 is a graph showing a change in the removal rate of nitrogen oxide by using the processing apparatus of the present invention with respect to the lapse time after starting of the test. Although the flow rate of the exhaust gas was increased, it was possible to keep the removal rate almost constant after a lapse of 20 minutes from starting of the test.

Test Example 4

An exhaust gas was processed at a flow rate of 1020 $Nm^3$/hour for 150 minutes by using the processing apparatus of the present invention, while setting the ozone introducing amount at 76 g/hour. In order to keep the pH value of the mixed aqueous solution at 8, and the ORP value at −40 mV, a reducing agent aqueous solution ($Na_2SO_3$ concentration: 94.5 g/L) was supplied at a rate of 1.2 L/min., and an alkaline aqueous solution (NaOH concentration: 10%) was supplied at a rate of 15 mL/min. The flow rate of the circulating mixed aqueous solution was set at 4500 L/hour. The results are shown in FIG. 9.

Test Example 5

An exhaust gas was processed for 180 minutes while setting the flow rate of the exhaust gas at 1430 $Nm^3$/hour and setting the ozone introducing amount at 110 g/hour. In order to keep the pH value of the mixed aqueous solution at 8, and the ORP value at −50 mV, a reducing agent aqueous solution ($Na_2SO_3$ concentration: 94.5 g/L) was supplied at a rate of 1.2 L/min., and an alkaline aqueous solution (NaOH concentration: 10%) was supplied at a rate of 15 mL/min. The results are shown in FIG. 9.

Figure 9:
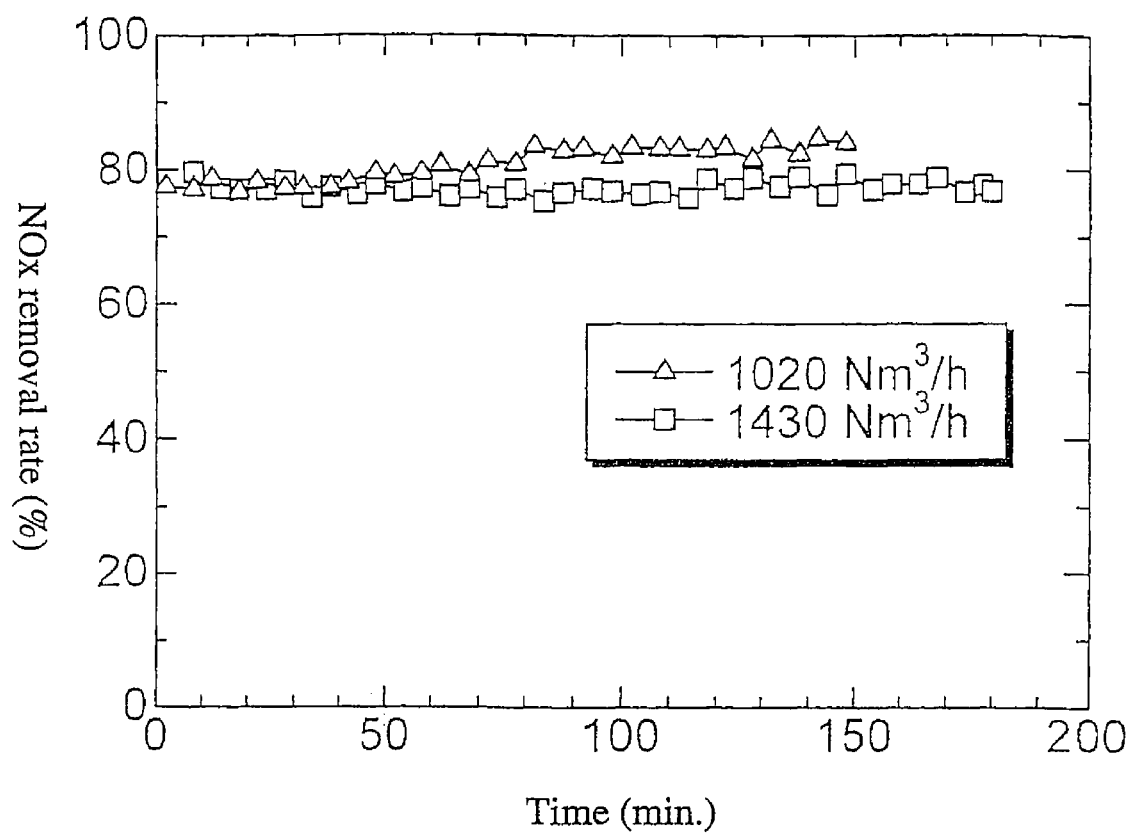
FIG. 9 A graph showing changes in the removal rate of nitrogen oxide in Test Examples 4 and 5, wherein Δ represents the removal rate in case where the flow rate of the exhaust gas is 1020 $Nm^3$/hour (Test Example 4), and □ represents the removal rate in case where the flow rate of the exhaust gas is 1430 $Nm^3$/hour (Test Example 5).

FIG. 9 is a graph showing changes in the removal rate of nitrogen oxide in Test Example 4 and Test Example 5, wherein Δ represents the removal rate in case where the flow rate of the exhaust gas was 1020 $Nm^3$/hour (Test Example 4), and □ represents the removal rate in case where the flow rate of the exhaust gas was 1430 $Nm^3$/hour (Test Example 5).

From FIG. 9, it can be found that by using the processing apparatus of the present invention, about 80% of the removal rate of nitrogen oxide could be kept in both cases where the flow rates of the exhaust gas were at 1020 $Nm^3$/hour, and 1430 $Nm^3$/hour.

INDUSTRIAL APPLICABILITY

According to the processing apparatus of the exhaust gas of the present invention, it is possible to continuously conduct the process for removing nitrogen oxide by the plasma chemical hybrid method for a long time with high efficiency on actual exhaust gas containing several % of carbon dioxide gas in addition to nitrogen oxide. Accordingly, this invention can contribute to preserve the global environment with low costs.

The invention claimed is:

1. An apparatus of an exhaust gas which is characterized by comprising:
  a wet reactor having an oxidation reaction area in a lower part and a reduction reaction area in an upper part;
  a mixed aqueous solution reservoir unit provided under the oxidation reaction area in the wet reactor;
  an atmospheric pressure low-temperature nonequilibrium discharge plasma reaction unit for generating a radical gas from air;
  a radical gas introducing line for introducing the radical gas generated in the plasma reaction unit to the oxidation reaction area;
  an exhaust gas introducing line for introducing an exhaust gas containing nitrogen oxide to the oxidation reaction area separately from the radical gas introducing line;
  a mixed aqueous solution circulation line for circulating a mixed aqueous solution consisting of a reducing agent aqueous solution and an alkaline aqueous solution and introducing the mixed aqueous solution into the reduction reaction area from the mixed aqueous solution reservoir;
  a pH meter and an ORP meter provided in a route which is branched from the mixed aqueous solution circulation line and leads to the mixed aqueous solution reservoir unit; and
  a reducing agent aqueous solution supplying line coming from a reducing agent aqueous solution tank and an alkaline aqueous solution supplying line coming from an alkaline aqueous solution tank, connected to the route on the downstream side of the pH meter and the ORP meter, respectively; and a mixed aqueous solution supply line branched from the mixed aqueous solution circulation line, passing through the ORP meter and the pH meter, joining on the downstream side of the reducing agent aqueous solution supplying line and the alkaline aqueous solution supplying line, and leading to the reservoir unit, wherein the reducing agent aqueous solution and the alkaline aqueous solution are supplied, on the basis of the measured pH and ORP values of the circulating mixed aqueous solution, into the mixed aqueous solution reservoir unit from the aqueous solution supplying line so that the pH value and the ORP value of the mixed aqueous solution consisting of the reducing agent aqueous solution and the alkaline aqueous solution to be introduced into the reduction reaction area fall within predetermined ranges.

2. The apparatus according to claim 1, wherein the atmospheric pressure low-temperature nonequilibrium discharge plasma reaction unit is an ozonizer of a silent discharge system.

3. The apparatus according to claim 1, wherein the wet reactor is a tower reactor or a column reactor.

4. The apparatus according to claim 1, wherein a partition having a plurality of through holes is provided between the reduction reaction area and the oxidation reaction area.

5. The apparatus according to claim 1, wherein (i) initially the mixed aqueous solution reservoir unit contains a fresh solution consisting of fresh reducing agent aqueous solution and fresh alkaline aqueous solution, prior to operating the apparatus on the exhaust gas and subsequently, during use, (ii) the mixed aqueous solution reservoir unit contains a mixture of the fresh solution, along with solution from the lower part of the wet reactor, and wherein the mixed aqueous solution circulation line (i) initially introduces the fresh solution into the reduction reaction area from the mixed aqueous solution reservoir and (ii) subsequently introduces the mixture of the fresh solution with the old solution into the reduction reaction area from the mixed aqueous solution reservoir.

* * * * *